(12) United States Patent
Sorstedt et al.

(10) Patent No.: US 10,604,156 B2
(45) Date of Patent: Mar. 31, 2020

(54) SYSTEM AND METHOD FOR ADJUSTING A ROAD BOUNDARY

(71) Applicant: VOLVO CAR CORPORATION, Gothenburg (SE)

(72) Inventors: Joakim Lin Sorstedt, Gothenburg (SE); Lars Hammarstrand, Varekil (SE); Lennart Svensson, Gothenburg (SE); Malin Lundgren, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 408 days.

(21) Appl. No.: 15/176,356

(22) Filed: Jun. 8, 2016

(65) Prior Publication Data
US 2016/0368505 A1     Dec. 22, 2016

(30) Foreign Application Priority Data

Jun. 16, 2015 (EP) .................................. 15172367

(51) Int. Cl.
*B60W 40/072*      (2012.01)
*G05D 1/02*        (2020.01)
(Continued)

(52) U.S. Cl.
CPC .......... *B60W 40/072* (2013.01); *B60W 30/10* (2013.01); *B60W 30/12* (2013.01);
(Continued)

(58) Field of Classification Search
None
See application file for complete search history.

(56) References Cited

U.S. PATENT DOCUMENTS 5,680,313 A * 10/1997 Whittaker .......... B60K 31/0008
                                                340/436
6,393,362 B1    5/2002 Burns
                (Continued)

FOREIGN PATENT DOCUMENTS

WO      2008089966      7/2008

OTHER PUBLICATIONS

Extended European Search Report for European Application No. EP 15172367.3, Completed by the European Patent Office, dated Feb. 3, 2016, 4 Pages.

*Primary Examiner* — John Olszewski
*Assistant Examiner* — Gerrad A Foster
(74) *Attorney, Agent, or Firm* — Brooks Kushman P.C.

(57) ABSTRACT

A system for adjusting a road boundary of a two dimensional virtual representation of a road for path planning of an autonomous vehicle includes a retrieval unit to retrieve a measured position and measured heading angle of the vehicle with respect to a reference. The system also includes an uncertainty unit to receive the measured position, the measured heading angle and map data of the road, and to determine a position uncertainty value and a heading angle uncertainty value representing an amount of uncertainty in the vehicle position and heading angle, respectively, on the road based on the input. The system also includes an adjustment unit to adjust a width and a heading angle of a drivable portion of the two dimensional virtual representation of the road, wherein the adjustment of the width and heading angle is based on the position uncertainty value and the heading angle uncertainty value, respectively.

12 Claims, 6 Drawing Sheets

(51) Int. Cl.
*G01C 21/30* (2006.01)
*B60W 30/12* (2020.01)
*B60W 30/10* (2006.01)
*G05D 1/00* (2006.01)

(52) U.S. Cl.
CPC ........... *G01C 21/30* (2013.01); *G05D 1/0088* (2013.01); *G05D 1/0274* (2013.01); *G05D 1/0278* (2013.01); *G05D 2201/0212* (2013.01); *G05D 2201/0213* (2013.01)

(56) References Cited

U.S. PATENT DOCUMENTS

2008/0243378 A1    10/2008  Zavoli
2013/0261870 A1*   10/2013  Halder ................. G05D 1/0274
                                                         701/25

* cited by examiner

SYSTEM AND METHOD FOR ADJUSTING A ROAD BOUNDARY

CROSS-REFERENCE TO RELATED APPLICATIONS

This application claims foreign priority benefits under 35 U.S.C. § 119(a)-(d) to European patent application number EP15172367.3, filed Jun. 16, 2015, which is incorporated by reference in its entirety.

TECHNICAL FIELD

Example embodiments presented herein are directed towards a method and a system for adjusting a road boundary of a two dimensional virtual representation of a road for path planning of an autonomous vehicle.

BACKGROUND

An autonomous vehicle is one which is capable of sensing its environment and navigating without the use of human input. It is envisioned that such vehicles will be capable of transitioning from an autonomous driving mode and a manual driving mode, in which a driver manually operates the vehicle. It is further envisioned that such autonomous driving may only be allowed on preapproved or certified roads or zones. Thus, a vehicle's initial driving segment will likely require the human driver to control the vehicle and later transition to an autonomous driving mode. While in an autonomous driving mode, a driver of a vehicle may engage in activities which may not be possible while the vehicle is in a manual driving mode. Examples of such activities are sleeping, working or using multimedia applications. Final segment may be initiated by the driver taking back control of the vehicle to depart the certified road and driving manually until destination is reached.

US2013261870A discloses an autonomous machine control system includes a positioning unit measuring position and orientation, and a navigation unit storing a route plan including an intended travel path along a lane. The lane has a width defined by a left-hand boundary and a right-hand boundary. The navigation unit receives an uncertainty value associated with the position or orientation, and creates a virtual two-dimensional footprint based on an actual machine footprint and the uncertainty value. The navigation unit also simulates movement of the virtual footprint along the intended travel path, calculates a left-hand margin value defined by the virtual footprint and the left-hand boundary, and calculates a right-hand margin value defined by the virtual footprint and the right-hand boundary. The margin values are compared to a predetermined value, and speed or travel direction of the machine is controlled if either of the margin values is below the predetermined value.

U.S. Pat. No. 6,393,362 discloses that the function of each autonomous vehicle in a surface mine is performed according to a predetermined trajectory related to its particular task and implemented by a guidance system through on-board GPS and two-way communication hardware. The current position of the vehicle is continuously monitored and correlated to the position of potential hazards along its path, so that corrective action can be taken by implementing appropriate, predetermined control strategies. Each vehicle is assigned a safety envelope that accounts for the vehicle's physical presence and operating tolerances. The safety envelope is characteristic of each vehicle and is defined by a variable space surrounding the vehicle wherein it may be physically present as it travels along its intended trajectory. The shape and size of the safety envelope is dynamically varied to meet safety requirements for current trajectory conditions facing the vehicle as it performs its autonomous function along its predetermined path. The safety envelope is changed according to a predetermined set of rules specific to the vehicle. Intersections between predetermined vehicle trajectories along paths and roadways within the mine's property are identified dynamically by monitoring current traffic conditions and establishing locations where the safety envelopes of vehicles traveling along approaching trajectories could overlap.

WO 2008089966 discloses a method and system for video-based road departure warning for a vehicle on a road. Road departure warning involves receiving an image of a road in front of the vehicle from a video imager, and detecting one or more road markings in the image corresponding to markings on the road. Then, analyzing the characteristics of an image region beyond the detected markings to determine a rating for drivability of the road corresponding to said image region, and detecting the lateral offset of the vehicle relative to the markings on the road based on the detected road markings. A warning signal is generated as function of said lateral offset and said rating.

US 20080243378 discloses a navigation system for use in a vehicle. The system includes an absolute position sensor, such as GPS, in addition to one or more additional sensors, such as a camera, laser scanner, or radar. The system further comprises a digital map or database that includes records for at least some of the vehicle's surrounding objects. These records can include relative positional attributes and traditional absolute positions. As the vehicle moves, sensors sense the presence of at least some of these objects, and measure the vehicle's relative position to those objects. This information, together with the absolute positional information and the added map information, is used to determine the vehicle's location, and support features such as enhanced driving directions, collision avoidance, or automatic assisted driving. In accordance with an embodiment, the system also allows some objects to be attributed using relative positioning, without recourse to storing absolute position information.

SUMMARY

Disclosed is a unit or system for adjusting a road boundary of a two dimensional virtual representation of a road for path planning of an autonomous vehicle. The system comprises a retrieval unit configured to retrieve a measured position and a measured heading angle of the vehicle with respect to a reference. The system also comprises an uncertainty unit configured to receive as input the measured position, the measured heading angle and map data of the road. The uncertainty unit is further configured to determine a position uncertainty value and a heading angle uncertainty value representing an amount of uncertainty in the vehicle's position and heading angle, respectively, on the road based on the input. The system further comprises an adjustment unit configured to adjust a width and a heading angle of a drivable portion of the two dimensional virtual representation of the road, wherein the adjustment of the width and heading angle is based on the position uncertainty value and the heading angle uncertainty value, respectively.

Thus it is an advantage that the unit or system can compute an estimate or measure of the vehicle position and heading angle and a corresponding uncertainty measure or value which reflects the accuracy of the estimate of the position and heading angle. Thus a drivable portion of the road ahead of the vehicle can be determined and adjusted regularly or continually as the vehicle drives along the road. This determined drivable portion is safe to drive in for the vehicle, as the certainty or probability that the drivable portion is in fact drivable is determined, and the level or threshold for the certainty or probability can be adjusted as well. Hereby changing conditions in the road curvature, weather, sensor performance etc. can be accounted for.

It is an advantage that the estimates or measures of the positioning and heading angle of the vehicle, which are not exact itself, are provided with an associated uncertainty or confidence measure which is taken into account when expressing the drivable portion or are of the road. Thus the positioning uncertainty is comprised in the definition or determination of the drivable portion of the road.

It is an advantage that the unit or system provides a solution to the problem that the uncertainties in the ego vehicle positioning estimate will propagate to the generated drivable area.

The reason for this problem is that the drivable area may be expressed in the ego vehicle's local coordinate system and since the exact position of the ego vehicle is not known, then neither is the exact location of the drivable area. The solution to the problem is that the positioning uncertainty influences the size of the drivable area. Thus if the uncertainty is large, the size of the drivable area will be small, and if the uncertainty is low, the size of the drivable area will be large. The drivable area may thus for example be computed so that all points inside the area have a probability of residing between the road boundaries, and this probability must be higher than a certain probability threshold.

The autonomous vehicle may be a self-driven car or another vehicle, such as a truck, a motorcycle etc.

The road boundaries of the two dimensional virtual representation can be represented as a list of global coordinates for each boundary, or as parametrized curves, e.g. splines.

The road boundaries define the drivable portion of the road for the vehicle.

The two dimensional virtual representation of the road may be a grid representation.

Alternatively, the two dimensional virtual representation of the road may be a polygonal chain representation.

The two dimensional (2D) virtual representation of the road boundaries is configured to provide the road boundaries to a path planning part or unit of the vehicles. The 2D representation is the exact location of the physical boundaries of the road stored on the map.

The position and heading angle may be measured or estimated by using internal sensor and/or external sensors in/on the vehicle, by means of data from a satellite navigation system, such as the global positioning system (GPS) or a system similar to GPS, by means of data from an inertial measurement unit (IMU), by means of data from a map.

Thus by means of sensors, an uncertainty in position and heading angle of the vehicle can be determined or measured.

The sensors themselves comprise an inherent uncertainty in their measurements. The uncertainty of the sensors depends on the location and environment.

The uncertainty of the sensors may be determined beforehand, i.e. before the vehicle starts driving, such as at the vehicle manufacturer before the vehicle is sold to its owner, or performed at regular intervals in the vehicle, such as every time the vehicle is started, or such as once every days, or such as for every 100 kilometers, every 500 kilometers, every 1000 kilometers etc, which the vehicle has driven.

The uncertainty of the sensors may be determined by means of a reference sensor, i.e. the uncertainty may be modelled with regard to a reference sensor.

The uncertainty of each sensor is not only sensor specific, but also depends on the environment, such as light conditions, weather conditions etc. For example the uncertainty of a sensor is higher if it is dark outside e.g. in the night, if it rains or snows etc.

The sensor uncertainty also depends on the location of the vehicle, such as depending on the amount and/or size of landmarks etc. which the sensor can detect.

The map may be a standard map, or an extended or special map comprising more information, such as a dense map, a high-definition (HD) map, a high-resolution map, an augmented map etc., which is a map comprising more data and information about the surroundings, such as of landmarks, guide rails, road lanes etc. The map may be stored in the vehicle, such as in a unit or a GPS unit in the vehicle, or the map may be stored in a remote storage, such as in a cloud storage.

The map may be used to look up in, such as look up the position of the vehicle. As the vehicle moves, the map may be looked up in continuously.

The position may be defined by means of a lateral position and a longitudinal position.

The heading angle is the angle of the vehicle, i.e. the angle of a longitudinal axis of the vehicle, relative to the driving lane. Thus heading angle corresponds to direction, orientation and/or the like.

The measured position and the measured heading angle of the vehicle is with respect to a reference, and the reference may be a landmark on the road, a GPS map position, a position in fixed coordinate system, such as in a local or global coordinate system.

A landmark may be a road sign, a building etc. with an exact position, such as an exact GPS. A landmark may be an advantage to use to measure the exact position of the vehicle. The landmark is identified by means of the internal and/or external sensors in the vehicle, e.g. sensors in the form of cameras, lasers, lidars, and by knowledge of the position of the landmark from map data.

Input data to the unit or system may thus comprise data about landmarks, such as the shape and position of the landmark, the type of landmark etc. As the vehicle drives along the road new or other landmarks may be detected continuously by the sensors in the vehicle.

The uncertainty values reflect the accuracy of the measured position and heading angle. The lower the uncertainty is, the higher is the accuracy of the measured position and heading angle, and the higher the uncertainty is, the lower is the accuracy of the measured position and heading angle.

The drivable portion is a drivable area or part of the road.

The adjustment of the width and heading angle of the drivable portion may be performed such that the certainty is for example 99.9% that the drivable portion is drivable road.

The width of the drivable portion which can be adjusted may be an adjustment in the lateral position of the vehicle on the road.

The unit or system may be a central processing unit (CPU), a processing unit, a processor, a control part of a path planning part and/or the like.

In some embodiments the retrieval unit is configured to retrieve the measured position and the measured heading angle at predetermined time intervals, and in some embodiments the uncertainty unit is configured to determine the position uncertainty value and the heading angle uncertainty value at predetermined time intervals, and in some embodiments the adjustment unit is configured to adjust the width and angle of the drivable portion of the road at predetermined time intervals.

Thus it is an advantage that these steps of retrieving, determining and adjusting may occur at regular time intervals. The time intervals for the different steps may be different or the same. The time intervals may be predetermined, and may occur such as every 1 millisecond (ms), every 2 ms, every 5 ms, every 10 ms, every 15 ms, every 20 ms, every 25 ms, every 30 ms, every 40 ms, every 50 ms, every 100 ms etc.

In some embodiments the reference is a landmark on the road, a map position in a satellite navigation system, such as GPS, and/or a position in a fixed coordinate system.

In some embodiments the uncertainty unit is further configured to determine the position uncertainty value and the heading angle uncertainty value from a probability distribution, where the probability distribution is based on a filter computation.

The input and data to make the probability distribution from is the measured position, the measured heading angle and map data of the road. The probability distribution is an output of a filter. The probability distribution may be a Gaussian distribution, i.e. a normal distribution etc.

In some embodiments the uncertainty unit is further configured to receive a measured speed and direction of the vehicle as an input for determining the position uncertainty value and the heading angle uncertainty value.

The measured speed and direction of the vehicle may be measured by means of internal sensors in the vehicle. The measured speed of the vehicle may be measured by means of a wheel speed sensor. The measured direction of the vehicle may be measured by means of an inertial measurement unit (IMU) providing yaw rate of the vehicle etc.

In some embodiments the filter computation is based on the input in the form of the measured position, the measured heading angle and map data of the road.

In some embodiments the filter of the filter computation is a Bayesian filter, such as a particle filter, or a Kalman filter, such as a regular Kalman filter, an extended Kalman filter or an unscented Kalman filter.

It is an advantage that the filter, e.g. the Bayesian filters, use the input, i.e. the measurements from e.g. GPS, IMU, relative measurements to landmarks, and the map, to compute the probability distribution. From this probability distribution it is possible to both compute an estimate of the position and the heading angle as well as an associated uncertainty value of the position and heading angle.

In some embodiments the uncertainty unit is configured to generate a number of samples from the probability distribution, where each sample comprises a position estimate and a heading angle estimate. The uncertainty unit is further configured to determine the position uncertainty value for each position estimate, where the position uncertainty value is based on the amount of samples generated with the respective position estimate. The uncertainty unit is also configured to determine the heading angle uncertainty value for each heading angle estimate, where the heading angle uncertainty value is based on the amount of samples generated with the respective heading angle estimate.

It is an advantage that samples are generated from the probability distribution, as the samples may provide a more correct and accurate measure of the position and heading angle than the actual measurements.

The samples will not contain any uncertainty values. By drawing samples from the distribution, one will obtain few unlikely samples and multiple copies of likely samples. The position uncertainty value and the heading angle uncertainty value are then described by the amount of samples that is generated with a certain position and heading angle value, respectively. For example, the position uncertainty value and the heading angle uncertainty value are low, when the number or amount of samples with the respective position and heading angle measure is high, and the position uncertainty value and the heading angle uncertainty value are high, when the number or amount of samples for the respective position and heading angle measure are low.

Generating samples according to the above from a probability distribution is common for a number of methods which may be used in the present disclosure. These methods may be termed the Monto Carlo method and a deterministic sampling method. A number of models may be used for representing the road, for example a grid representation and a polygonal chain representation. Thus a method and a road representation may be a deterministic sampling with a polygonal chain representation, or be a deterministic sampling with a grid representation, or an optimal sampling, such as selecting optimal samples, with polygonal chain representation, etc. The determination of which samples that are optimal may be based on a number of predefined parameters etc. Thus the samples may be selected or generated deterministically, such as generated using or based on a deterministic sampling. Alternatively, the samples may be generated using or based on a Monte Carlo grid representation.

The samples may be generated for every 1 meter of the road, for every 50 cm, for every 25 cm, or for every 1.5 m of the road etc.

In some embodiments the adjustment unit is configured to determine for each sample the portion in front of the vehicle which is drivable. The adjustment unit is further configured to accumulate the portions determined to be drivable. The adjustment unit is also configured to compute the drivable portion of the two dimensional virtual representation of the road, from the accumulated portions determined to be drivable, to be a portion in which the amount of samples generated with the respective position estimate and the respective heading angle estimate is higher than a certain threshold.

It is an advantage that for each sample it is evaluated which area or portion in front of the vehicle that is drivable. By accumulating all such areas or portions from all samples, it is possible to use a threshold to determine which area or portion in front of the vehicle that is drivable.

The portion in which the amount of samples generated with the respective position estimate and the respective heading angle estimate is higher than a certain threshold corresponds to the portion in which the uncertainty value is lower than a certain threshold. Thus the uncertainty value must be lower than a certain threshold in order for the portion to be drivable. Alternatively it can be termed that a certainty value must be higher than a certain threshold in order for the portion to be drivable, where the certainty value is based on the amount of samples generated with the respective position estimate and the respective heading angle estimate.

In some embodiments the position uncertainty value and the heading angle uncertainty value are estimates comprising a confidence or accuracy level or interval.

It is an advantage that the position uncertainty value an heading angle uncertainty value can be provided as estimates with a confidence or accuracy level or interval.

Thus such estimates with a confidence or accuracy level or interval are alternatives to drawing samples from a probability distribution as described above.

The estimates of the position uncertainty value may be represented as $\varepsilon x$ for the lateral or x-axis position, and as $\varepsilon y$ for the longitudinal or y-axis position. Thus the position, xpos, ypos, may be represented as xpos=x±εx, ypos=y±εy.

The estimates of the heading angle uncertainty value may be represented as $\varepsilon \alpha$. Thus the heading angle, αpos, may be represented as αpos=α±εα.

In some embodiments the position uncertainty value and the heading angle uncertainty value are affected by environmental factors in the surroundings of the vehicle and/or quality of one or more sensors used to measure the position and heading angle of the vehicle and/or quality of the map data of the road.

The environmental factors may for example be weather, e.g. rain, snow; lightning conditions, e.g. daylight or night; temperature, e.g. freezing temperatures, heat waves etc.

According to an embodiment, a vehicle is disclosed comprising a unit or system according to any of the preceding embodiments.

According to an embodiment a method is disclosed for adjusting a road boundary of a two dimensional virtual representation of a road for path planning of an autonomous vehicle performed in a unit or system. The method comprises retrieving a measured position and a measured heading angle of the vehicle with respect to a reference in a retrieval unit. The method further comprises receiving as input the measured position, the measured heading angle and map data of the road in an uncertainty unit. The method also comprises determining a position uncertainty value and a heading angle uncertainty value representing an amount of uncertainty in the vehicle's position and heading angle, respectively, on the road based on the input, in the uncertainty unit. The method additionally comprises adjusting a width and a heading angle of a drivable portion of the two dimensional virtual representation of the road in an adjustment unit, wherein the adjustment of the width and heading angle is based on the position uncertainty value and the heading angle uncertainty value, respectively.

According to an embodiment a computer readable medium is disclosed comprising program instructions for adjusting a road boundary of a two dimensional virtual representation of a road for path planning of an autonomous vehicle performed in a unit or system, wherein execution of the program instructions by one or more processors of a computer system causes the one or more processors to carry out the steps of retrieving a measured position and a measured heading angle of the vehicle with respect to a reference; receiving as input the measured position, the measured heading angle and map data of the road; determining a position uncertainty value and a heading angle uncertainty value representing an amount of uncertainty in the vehicle's position and heading angle, respectively, on the road based on the input; and adjusting a width and a heading angle of a drivable portion of the two dimensional virtual representation of the road, wherein the adjustment of the width and heading angle is based on the position uncertainty value and the heading angle uncertainty value, respectively.

In some embodiments the computer readable medium further comprises executable instructions causing one or more processors to carry out the steps of the method above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. The example embodiments presented herein are described with the use of a vehicle in the form of an automobile. It should be appreciated that the example embodiments presented herein may be applied to any form of vehicle or means of transportation comprising, for example, cars, trucks, busses and construction equipment, as well as airplanes, boats, ships, and space craft.

Autonomous driving allows an occupant of a vehicle, particularly a driver, to engage in activities that would otherwise not be possible while a vehicle is in a manual driving mode. Thus, at least some of the example embodiments described herein may provide a system in which a driver and/or passenger of a vehicle may schedule activities during an autonomous driving mode which may not necessarily be possible during a manual driving mode.

An autonomous or self-driven vehicle should be able to guarantee the safety of the passengers and other road users. A significant part of this objective is to safely navigate the vehicle in the correct lane along the road. The navigation task consists of two steps: first a path planning step, which selects a safe trajectory for the vehicle, and second a control part which steers the vehicle along the selected path. To make a safe plan of the vehicle trajectory, the path planning algorithm needs a detailed description of the road ahead. A common approach is to store this detailed road description in an accurate map and then have a system determining the vehicle position in the map. Using the estimated position of the vehicle, a description of the road ahead can be extracted from the map. Here this description is referred to as a "drivable portion" or the "drivable area", and FIG. 1 shows a system architecture of how the drivable area is generated.

Figure 1:
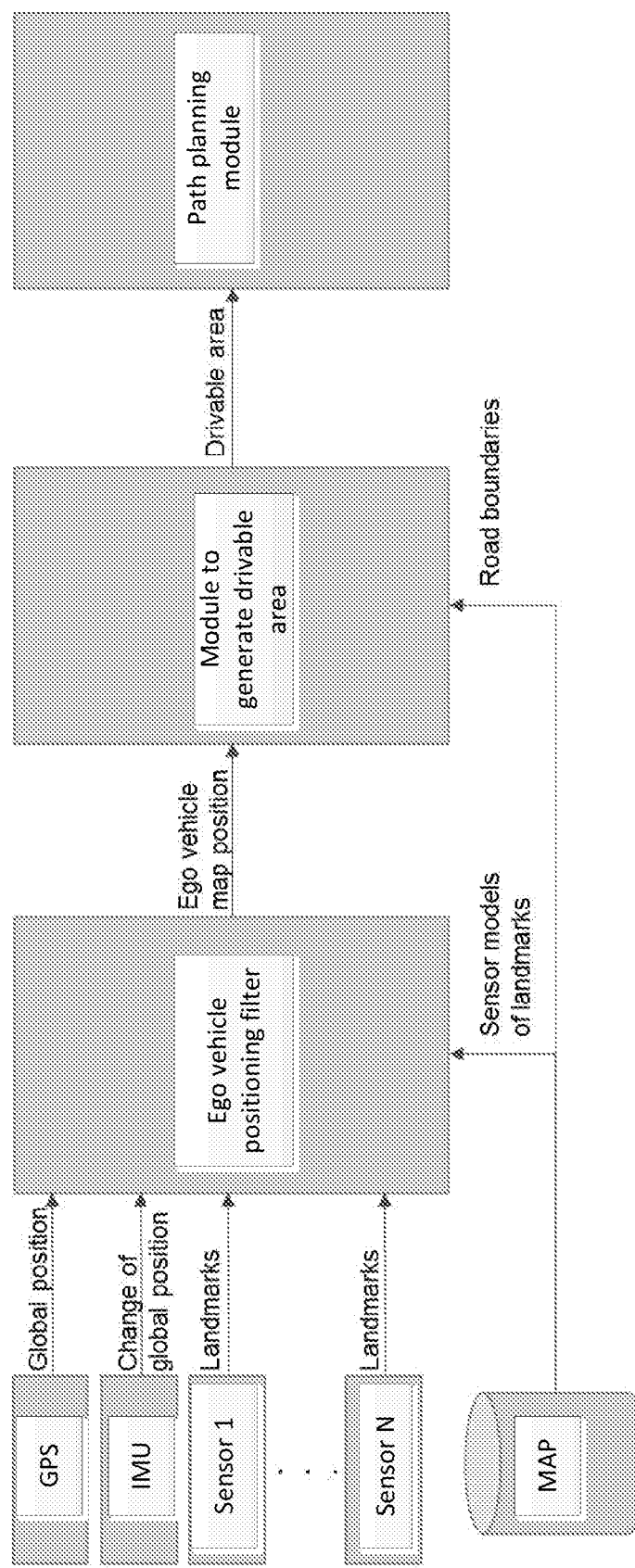
FIG. 1 shows a system architecture of how the drivable portion is generated.

Starting from the left in the FIG. 1 there are a number of sensors, sensor 1, . . . , sensor N, measuring the dynamic properties of the vehicle and the position and properties of surrounding landmarks. The positioning filter estimates the vehicle position by matching the sensor measurements of landmarks with the exact positions of the landmarks stored in the map, MAP in the figure.

The dynamic properties of the vehicle may be speed, acceleration, rotation, yaw rate estimation, orientation or heading angle etc.

The sensors measuring the dynamic properties of the vehicle and the position and properties of surrounding landmarks may be external sensors and/or internal sensors in the vehicle. The sensors may be devices communicating with space-based satellite navigation systems, such as the Global Positioning System (GPS), inertial measurement units (IMUs), cameras, radar sensors, lidar sensor, accelerometers, gyroscopes etc.

The sensors, such as cameras, may be used for sensing or capturing landmarks in the surroundings, such as traffic signs, and/or may be used for sensing or capturing lines on the road etc. The sensors, such as cameras, may be configured to sense or capture certain things in the surroundings, such as buildings etc.

The sensors, such as lasers or laser scanners, may be used for sensing, scanning, capturing objects, such as road barriers, traffic signs etc.

The sensors, such as radars, may be used for sensing, or capturing road barriers etc.

The external sensors, such as cameras, lasers, radars etc. may capture and/or transmit data to the positioning filter or ego vehicle positioning filter at predetermined time intervals, such as every 40 milliseconds.

The internal sensors, such as vehicle speed sensors, IMU, gyroscopes, accelerometers etc., may capture and/or transmit data to the positioning filter or ego vehicle positioning filter continuously or constantly or at predetermined time intervals, such as every 1 millisecond. Thus the internal sensor data may be captured and/or transmitted more often than the external sensor data.

The landmarks may be stationary objects which can be represented in a map, such as unique objects, such as buildings, mountains, tunnels, road signs, traffic signs etc.

The map may be a two dimensional (2D) map stored in a GPS unit in the vehicle, it may be high definition (HD) map comprising more information about the road and its surroundings than a standard map etc.

The parametrization and output of the positioning filter are described below.

The GPS provides the global position of the vehicle to the ego vehicle positioning filter. The IMU provides a change in the global position of the vehicle to the ego vehicle positioning filter. The sensors, sensor 1, . . . sensor N, provides information and position of landmarks to the ego vehicle positioning filter. The map provides sensor models of the landmarks to the ego vehicle positioning filter. Based on this input, the ego vehicle positioning filter estimates an ego vehicle map position which is provided to the unit or module generating the drivable area. Information about the road boundaries of the road from the map is also provided to the module generating the drivable area. The output of the module generating the drivable area is the drivable area, and this drivable area is inputted to the path planning module or unit.

Thus the module or unit in FIG. 1 called "Generate drivable area" combines the positioning estimate with the exact location of the physical boundaries of the road stored in the map. These boundaries can be represented in many different ways, for instance as a list of global coordinates for each boundary, or as parametrized curves, e.g. splines. The positioning estimate is not exact, but has an associated uncertainty/confidence measure that needs to be taken into account when expressing the drivable portion. The system and method described in the claims and in this description suggests a solution to how the positioning uncertainty can be included into the estimate or measure of the drivable area. More details on the drivable area disclosure are presented below.

Ego Vehicle Positioning

The task of the ego vehicle positioning filter, see FIG. 1, is to compute an estimate of the vehicle position and a corresponding uncertainty measure reflecting the accuracy of the estimate. The position can be expressed using many different parametrizations and coordinate systems. Similarly, there exist multiple methods for computing the position estimate, and to express the uncertainty measure, e.g. using a posterior probability distribution or confidence levels as disclosed in the embodiments.

Figure 2:
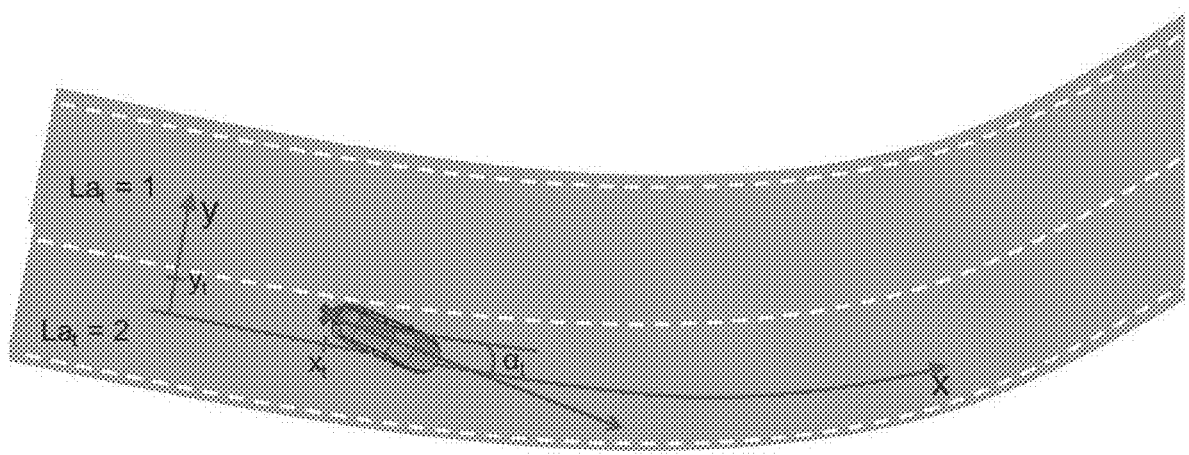
FIG. 2 shows an example where the ego vehicle position is expressed in a curved coordinate system.

The ego vehicle position may be expressed in a curved coordinate system (xt; yt) as is shown in FIG. 2. Here, xt is the longitudinal position along the road at time t, and yt is the lateral position in the lane. Additionally the ego vehicle positioning filter, or positioning filter, estimates the heading angle at relative to the lane and a discrete parameter Lat which corresponds to in which lane the ego vehicle is positioned. Thus the heading angle αt is a direction or orientation relative to the lane and the heading angle αt may correspond to an orientation, a directions, etc. Lat=1 corresponds to a one or a first lane, and Lat=2 corresponds to another or a second lane.

The state vector of the positioning filter is defined as $xt=[xt\ yt\ \alpha t\ Lat]^T$, and the measurements from a sensor i collected at a time ti are stored in a vector $z^i t$. All sensor observations retrieved up to time t are represented by $Z_{0:t}$. A Bayesian approach may be used in which the positioning filter computes the posterior distribution $p(xt\ |\ Z_{0:t};M)$, where M is the map. With this implementation $p(xt\ |\ Z_{0:t};M)$ can be used to compute an estimate $\hat{x}t$ of the position state vector xt and an associated uncertainty description of the estimate.

In Bayesian statistics, the posterior probability of a random event or an uncertain proposition is the conditional probability that is assigned after the relevant evidence or background is taken into account. Similarly, the posterior probability distribution is the probability distribution of an unknown quantity, treated as a random variable, conditional on the evidence obtained from an experiment or survey.

Drivable Area

Figure 3:
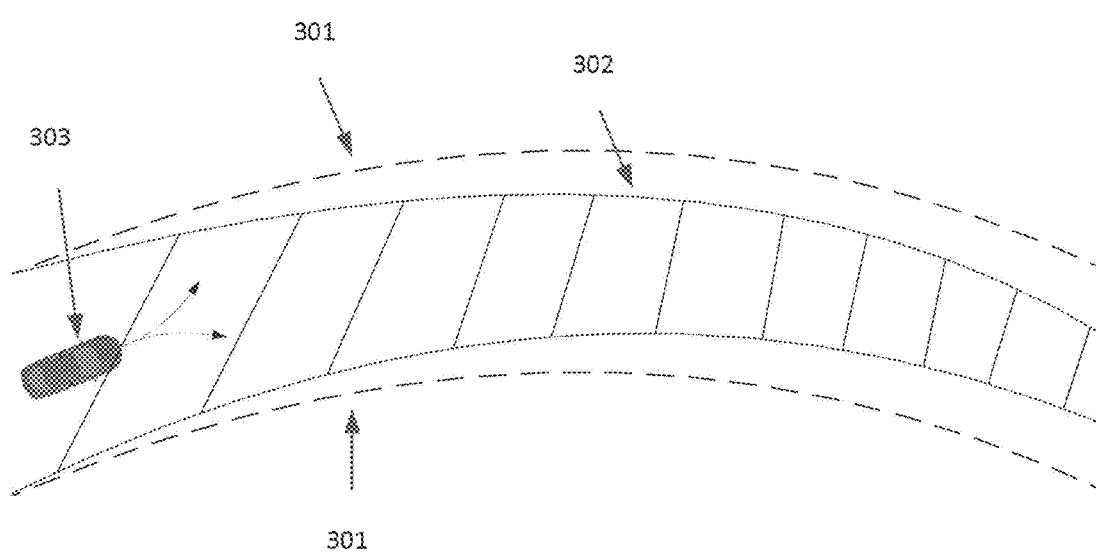
FIG. 3 shows an example of how the drivable portion is affected by the uncertainty in the orientation or heading angle of the ego vehicle.
Figure 4:
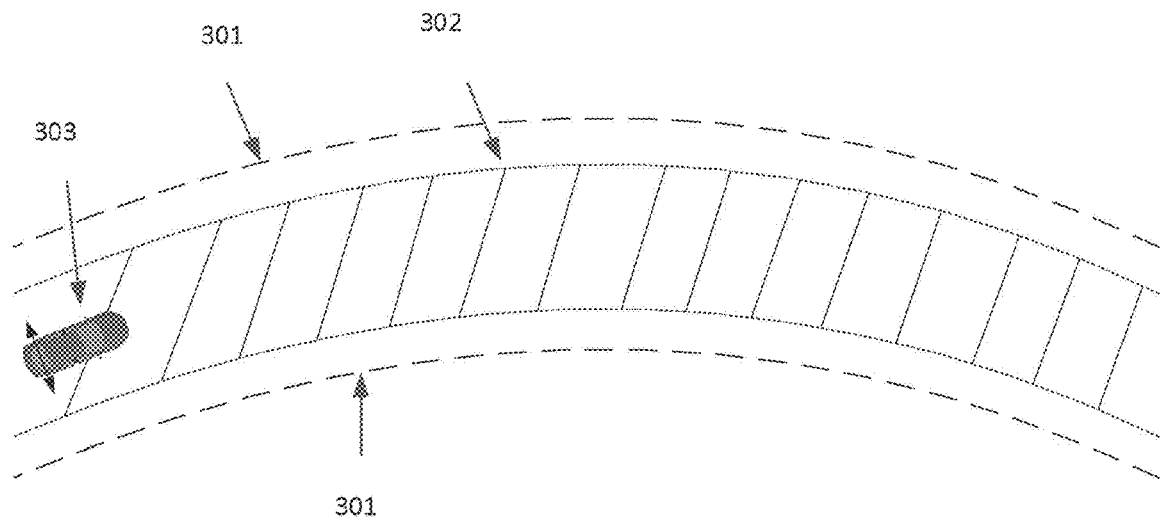
FIG. 4 shows an example of how the drivable portion is affected by the uncertainty in the lateral position of the ego vehicle.
Figure 5:
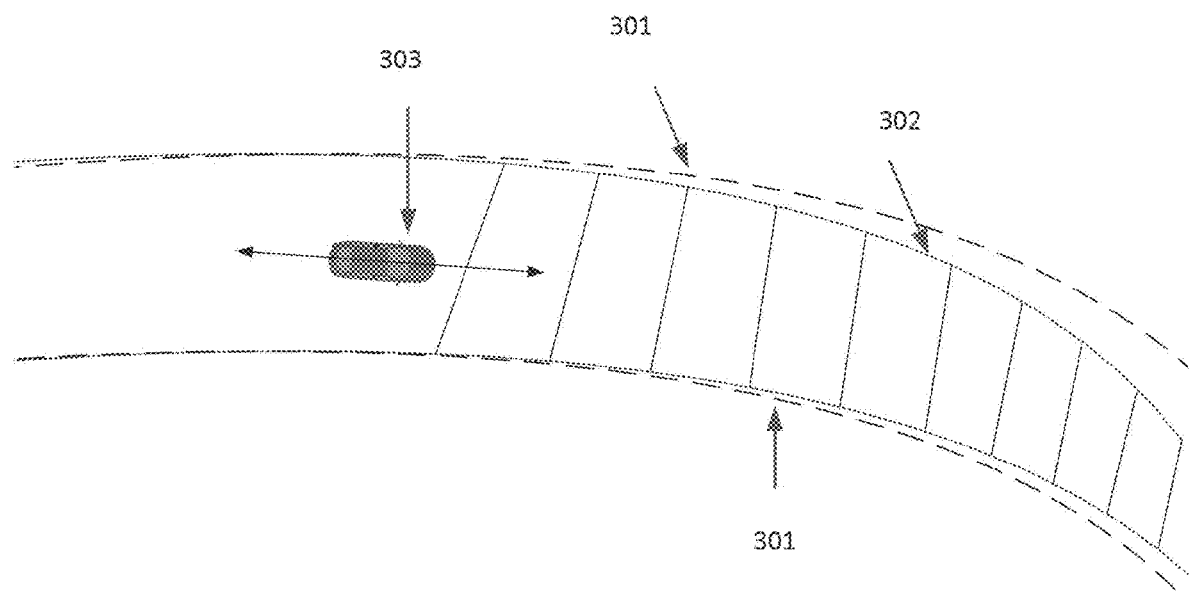
FIG. 5 shows an example of how the drivable portion is affected by the uncertainty in the longitudinal position of the ego vehicle.

The task of the module or unit generating the drivable area or drivable portion is to provide the path planning module with a description or information of the area in front of the ego vehicle which is safe to drive in, and is expressed in the vehicle's local Cartesian coordinate system (xego; yego). A complication, which is also solved by the system and method of the present application, is that the uncertainties in the ego vehicle positioning estimate will propagate to the generated drivable area. This is because the drivable area is expressed in the ego vehicle's local coordinate system and since the exact position of the ego vehicle is not known, then neither is the exact location of the drivable area. Since a non-deterministic description of the drivable area cannot be handled by most path planning algorithms, the present application provides that the positioning uncertainty may influence the size of the drivable area. If the positioning uncertainty is large or high, the size of the drivable area will be small, and vice versa, i.e. if the positioning uncertainty is low, the size of the drivable area or drivable portion is large. A general idea is to compute the drivable area so that all points inside the area have a probability of residing between the road boundaries that is higher than a certain threshold. As an example, consider the FIGS. 3-5, which show how the uncertainties in position and heading affect the drivable area. In FIGS. 3-5, the true road boundaries 301 stored in the map are represented by the dashed lines and the resulting drivable area 302 is between the dotted lines.

FIG. 3 shows that the drivable area 302 is affected by the uncertainty in the orientation or heading angle, indicated by curved arrows, of the ego vehicle 303. As a result is the drivable area 302 close to the vehicle 303 almost as wide as the true area indicated by the road boundaries 301 stored in the map, whereas it is reduced further away.

FIG. 4 shows that the drivable area 302 is affected by the uncertainty in the lateral position, indicated by lateral arrows, of the ego vehicle 303. The drivable area 302 is reduced by the same size relative to the road boundaries 301 along the road.

FIG. 5 shows that the drivable area 302 is affected by the uncertainty in the longitudinal position, indicated by longitudinal arrows, of the ego vehicle 303. The drivable area 302 close to the vehicle 303 is as wide as the true area indicated by the road boundaries 301 stored in the map, whereas it is reduced further away.

In the following, more detailed methods on how the drivable area can be computed given an exact map and an uncertain position estimate are provided. It should be noted that in all examples presented in this document there is only one drivable area related to the lane in front of the ego vehicle, but it is understood the methods can be generalized such that that there can be multiple drivable areas related to multiple lanes adjacent to each other.

A Monte Carlo method with a grid representation.

Figure 6:
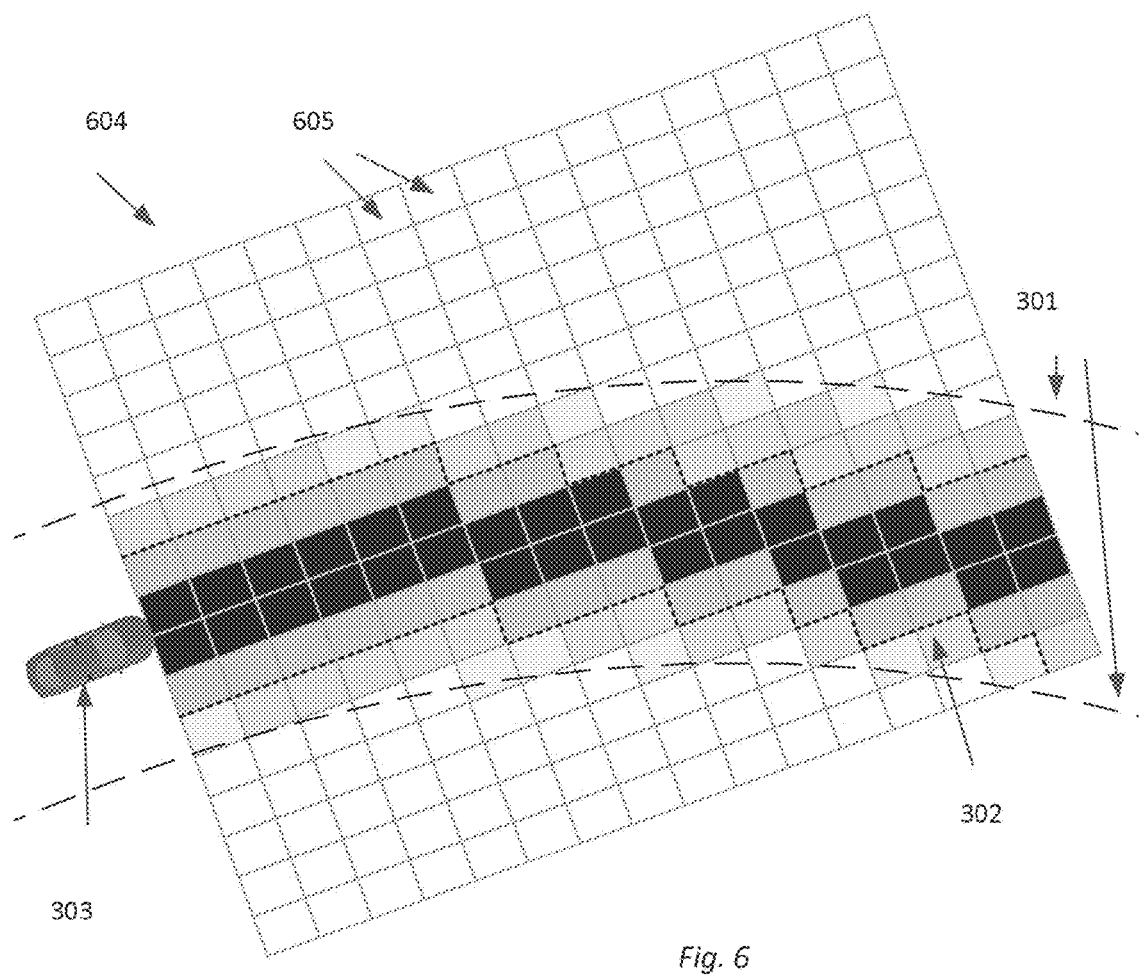
FIG. 6 illustrates a method which divides the area in front of the ego vehicle into a grid and computes the probability that each cell in the grid is located on the road indicated by the road boundaries.

FIG. 6 illustrates a method, e.g. a Monto Carlo method, which divides the area in front of the ego vehicle 303 into a grid 604 and computes the probability that each cell 605 in the grid 604 is located on the road indicated by the road boundaries 301, dashed lines. The probability is computed using a Monte Carlo method, in which a large number of independent samples are drawn from the posterior distribution $x(i)\ t \sim p(xt\ |\ Z_{0:t}; M)$, $i=1, \ldots, N$. For each sample $x(i)$ t, it is evaluated which of the cells 605 in the grid 604 are on the road and which are not. By accumulating the results from all samples, a grid can be constructed, where each cell contains the number of samples for which that particular cell was evaluated to be on the road. The result would be similar to what is shown in FIG. 6. By setting a threshold on how large probability is required in each cell 605 for it to be considered part of the road, a deterministic drivable area 302, indicated by dotted line, can be generated.

The threshold on how large probability is required in each cell 605 for it to be considered part of the road 301 may be e.g. 99%, such as 99.9%, as the safety is of optimum importance for autonomous vehicles. The 99.9% probability may be indicated by the dark cells in the grid 604. The 99% probability may be indicated by the grey cells in the grid.

Monte Carlo methods, or Monte Carlo experiments, are a broad class of computational algorithms that rely on repeated random sampling to obtain numerical results; typically one runs simulations many times over in order to obtain the distribution of an unknown probabilistic entity.

A deterministic sampling method with a grid representation.

This second method uses the same grid representation as the first method see FIG. 6, but its probability values are computed using a much smaller set of samples, $x(i)$ t, $i=1, \ldots, n$. Additionally, instead of randomly drawing these from the posterior distribution $p(xt\ |\ Z_{0:t}; M)$, they are selected deterministically, for instance by selecting samples on a contour line of the posterior distribution. Apart from these differences, it is the same procedure as in the first method shown in FIG. 6: for each sample evaluate which cells 605 are located on the road 301, and then form an accumulated grid from which a drivable area can be generated 302.

A deterministic sampling method with a polygonal chain representation.

Figure 7:
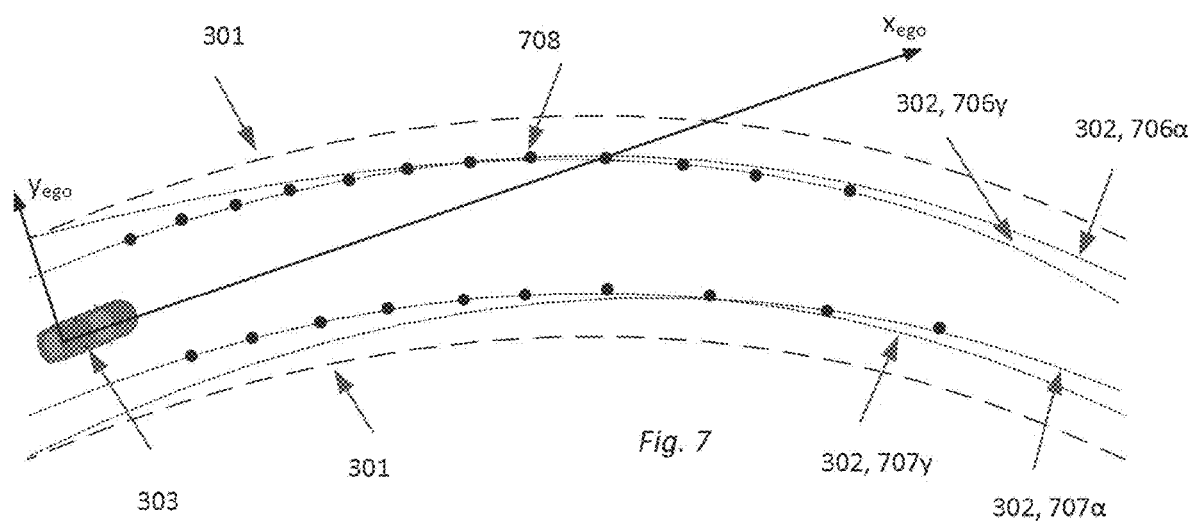
FIG. 7 illustrates the drivable portion using a pair of polygonal chains, one polygonal chain for the left boundary and another polygonal chain for the right boundary.

This third method is similar to the second method described above, in the sense that it deterministically selects a set of samples $x(i)$ t; $i=1, \ldots,$ n from the probability distribution $p(xt\ |\ Z_{0:t}; M)$. However, instead of using a grid representation as shown in FIG. 6, the third method, see FIG. 7, represents the drivable area 302 using a pair of polygonal chains, one or a first polygonal chain 706 for the left boundary and one or a second polygonal chain 707 for the right boundary. Each chain 706, 707 is defined by a sequence of coordinate pairs 708 called (xj ego; yj ego); $j=1, \ldots, L$, in which the longitudinal coordinates xj ego; $j=1, \ldots, L$ are preselected, for instance by equidistantly sampling the longitudinal axis y a certain distance ahead. To find the lateral coordinates, yj ego; $j=1, \ldots, L$, one pair of polygonal chains is computed for each sample $x(i)$ t; $i=1, \ldots,$ n by transforming the road boundaries 301 in the map to the sample's local coordinate system. All samples have different local coordinate systems since they have different values of $xt=[xt\ yt\ \alpha t\ Lat]^T$. The lateral coordinates yj ego; $j=1, \ldots, L$ can then be decided by selecting the lateral coordinates from all the samples which results in the most narrow drivable area 302. In FIG. 7 a simplified example is shown, in which the dashed lines are the true drivable area indicated by the road boundaries 301 and the dotted lines 706y, 706α, 707y, 707α are the results of transforming these boundaries using two different values of at and two different values of yt thereby obtaining the computed drivable area 302.

An optimal sampling method with a polygonal chain representation.

This fourth method uses the same polygonal chain representation as the third method, see FIG. 7, but the samples are not selected deterministically. Instead they are computed like this: for each longitudinal coordinate find the optimal sample $x(i)$ t which is on a selected contour line of the probability distribution $p(xt \mid Z_{0:t};M)$ and which has the smallest lateral distance to the left road boundary, or largest lateral distance to the right road boundary.

Figure 8:
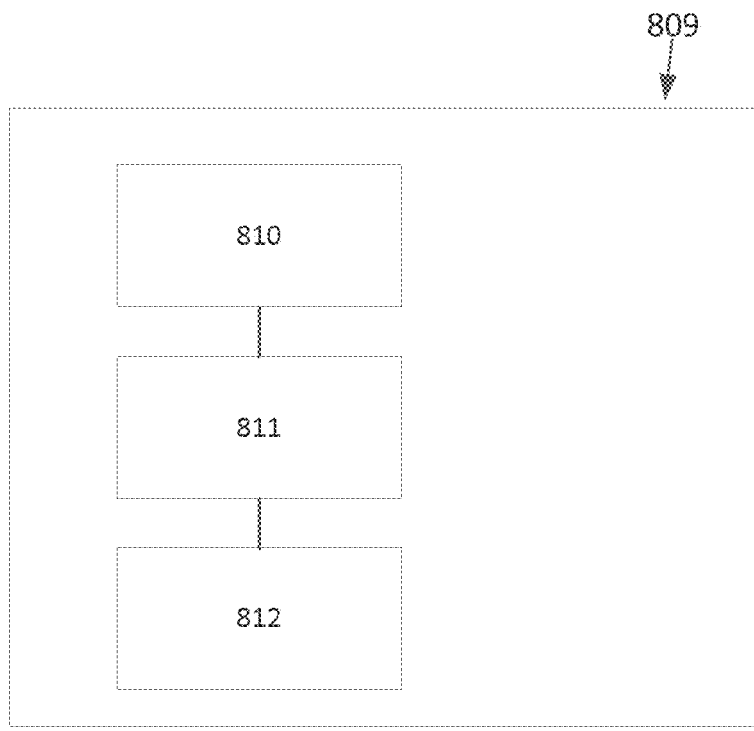
FIG. 8 shows an illustrative example of a unit or system configured for adjusting a road boundary of a two dimensional virtual representation of a road for path planning of an autonomous vehicle.

FIG. 8 shows an illustrative example of a system or unit for adjusting a road boundary of a two dimensional virtual representation of a road for path planning of an autonomous vehicle.

The system or unit 809 for adjusting a road boundary may comprise a retrieval unit 810 configured to retrieve a measured position and a measured heading angle of the vehicle with respect to a reference.

The system or unit 809 may comprise an uncertainty unit 811 configured to receive as input the measured position, the measured heading angle and map data of the road. The uncertainty unit 811 is further configured to determine a position uncertainty value and a heading angle uncertainty value representing an amount of uncertainty in the vehicle's position and heading angle, respectively, on the road based on the input.

The system or unit 809 may comprise an adjustment unit 812 configured to adjust a width and a heading angle of a drivable portion of the two dimensional virtual representation of the road, wherein the adjustment of the width and heading angle is based on the position uncertainty value and the heading angle uncertainty value, respectively. Such a two dimensional virtual representation may comprise an image or images presented on a screen or display, and/or may be provided to a vehicle autonomous driving system or arrangement for use in autonomous control of the vehicle.

The system or unit 809 may be a central processing unit (CPU), a processing unit, a processor, a control part of a path planning part and/or the like. In that regard, those skilled in the art will also appreciate that the system or unit 809, including the retrieval unit 810, uncertainty unit 811 and/or adjustment unit 812 described herein may refer to and/or comprise a combination of analog and digital circuits and/or one or more processors and memory configured with software and/or firmware, e.g., stored in the memory, that when executed by the one or more processors perform the functions and/or operations described herein. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

Figure 9:
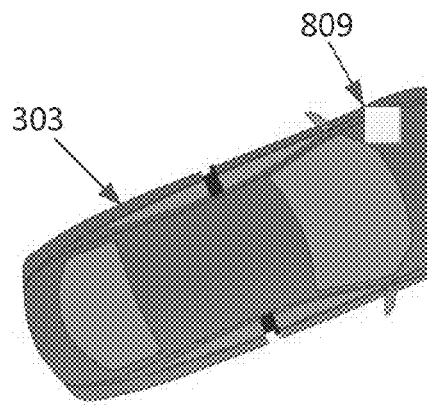
FIG. 9 schematically illustrates a vehicle comprising a unit or system configured for adjusting a road boundary of a two dimensional virtual representation of a road for path planning of an autonomous vehicle.

FIG. 9 schematically illustrates a vehicle 303 comprising a unit 809 configured for adjusting a road boundary of a two dimensional virtual representation of a road for path planning of an autonomous vehicle. The system or unit 809 may be placed in other positions in the vehicle 303 than shown on the figure.

Figure 10:
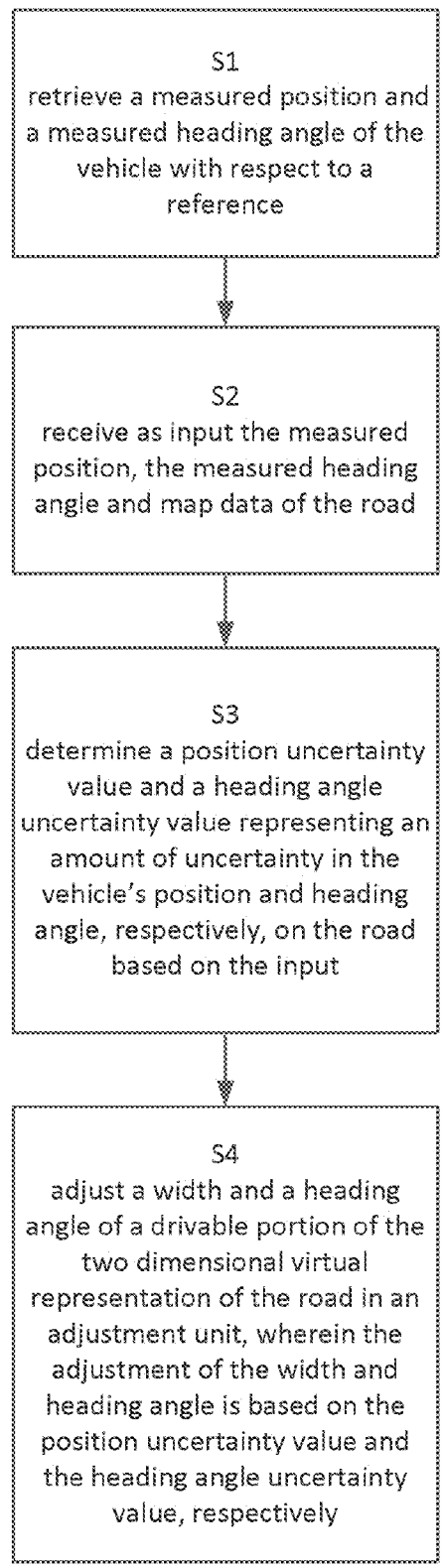
FIG. 10 illustrates a flow chart of a method for adjusting a road boundary of a two dimensional virtual representation of a road for path planning of an autonomous vehicle.

FIG. 10 illustrates a flow chart of a method for adjusting a road boundary of a two dimensional virtual representation of a road for path planning of an autonomous vehicle performed in a unit or system. The method comprises:

In S1 a measured position and a measured heading angle of the vehicle with respect to a reference are retrieved in a retrieval unit.

In S2 the measured position, the measured heading angle and map data of the road are received as input in an uncertainty unit.

In S3 a position uncertainty value and a heading angle uncertainty value are determined in the uncertainty unit, the position uncertainty value and a heading angle uncertainty value represents an amount of uncertainty in the vehicle's position and heading angle, respectively, on the road based on the input.

In S4 a width and a heading angle of a drivable portion of the two dimensional virtual representation of the road is adjusted in an adjustment unit, wherein the adjustment of the width and heading angle is based on the position uncertainty value and the heading angle uncertainty value, respectively.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for adjusting a drivable portion within road boundaries of a two dimensional virtual representation of a road for path planning within the drivable portion by a path planning unit of an autonomous vehicle, the system comprising:
    a retrieval unit configured to retrieve a measured position of the vehicle with respect to a reference and a measured heading angle of the vehicle with respect to the reference, wherein the reference comprises a landmark on the road, a Global Positioning System (GPS) map position, or a position in a fixed coordinate system;
    an uncertainty unit configured to receive as input the measured position, the measured heading angle and map data of the road;
    the uncertainty unit further configured to
        generate a number of samples from a probability distribution, where each sample comprises a position estimate and a heading angle estimate,
        determine for each sample the portion in front of the vehicle which is drivable,
        accumulate the portions determined to be drivable,
        compute the drivable portion of the two-dimensional virtual representation of the road, from the accumulated portions determined to be drivable, to be a portion in which an amount of samples generated with the respective position estimate and the respective heading angle estimate is higher than a threshold, and
        determine a position uncertainty value and a heading angle uncertainty value representing an amount of uncertainty in the vehicle's position and heading angle, respectively, on the road based on the input and the probability distribution; and
    an adjustment unit configured to adjust a width and a heading angle of a drivable portion of the two dimensional virtual representation of the road ahead of the autonomous vehicle, wherein the adjustment of the width and heading angle is based on the position uncertainty value and the heading angle uncertainty value, respectively, and the drivable portion is provided to the path planning unit for path planning within the drivable portion.

2. The system of claim 1 wherein the retrieval unit is configured to retrieve the measured position and the measured heading angle, the uncertainty unit is configured to determine the position uncertainty value and the heading angle uncertainty value, and the adjustment unit is configured to adjust the width and angle of the drivable portion of the road at predetermined time intervals.

3. The system of claim 1 wherein the uncertainty unit is further configured to determine the position uncertainty value and the heading angle uncertainty value from a probability distribution, where the probability distribution is based on a filter computation.

4. The system of claim 1 wherein the uncertainty unit is further configured to receive a measured speed and direction of the vehicle as an input for determining the position uncertainty value and the heading angle uncertainty value.

5. The system of claim 3 wherein the filter computation is based on the input in the form of the measured position, the measured heading angle and map data of the road.

6. The system of claim 5 wherein the filter is a Bayesian filter or a Kalman filter.

7. The system of claim 3 wherein the uncertainty unit is configured to:
    determine the position uncertainty value for each position estimate, where the position uncertainty value is based on the amount of samples generated with the respective position estimate;
    determine the heading angle uncertainty value for each heading angle estimate, where the heading angle uncertainty value is based on the amount of samples generated with the respective heading angle estimate.

8. The system of claim 1 wherein the position uncertainty value and the heading angle uncertainty value are estimates comprising a confidence level.

9. The system of claim 1 wherein the position uncertainty value and the heading angle uncertainty value are affected by environmental factors in the surroundings of the vehicle or by one or more sensors used to measure the position and heading angle of the vehicle or by the map data of the road.

10. The system according to claim 1 further comprising the vehicle.

11. A method for adjusting a drivable portion within road boundaries of a two dimensional virtual representation of a road for path planning within the drivable portion by a path planning unit of an autonomous vehicle, the method comprising:
    retrieving a measured position of the vehicle with respect to a reference and a measured heading angle of the vehicle with respect to the reference in a retrieval unit, wherein the reference comprises a landmark on the road, a Global Positioning System (GPS) map position, or a position in a fixed coordinate system;
    receiving as input the measured position, the measured heading angle and map data of the road in an uncertainty unit;
    generating a number of samples from a probability distribution, where each sample comprises a position estimate and a heading angle estimate;
    determining for each sample the portion in front of the vehicle which is drivable;
    accumulating the portions determined to be drivable;
    computing the drivable portion of the two-dimensional virtual representation of the road, from the accumulated portions determined to be drivable, to be a portion in which an amount of samples generated with the respective position estimate and the respective heading angle estimate is higher than a threshold;
    determining, in the uncertainty unit, a position uncertainty value and a heading angle uncertainty value representing an amount of uncertainty in the vehicle's position and heading angle, respectively, on the road based on the input and the probability distribution; and
    adjusting a width and a heading angle of a drivable portion of the two dimensional virtual representation of the road ahead of the autonomous vehicle in an adjustment unit, wherein the adjustment of the width and heading angle is based on the position uncertainty value and the heading angle uncertainty value, respectively, and the drivable portion is provided to the path planning unit for path planning within the drivable portion.

12. A non-transitory storage medium comprising computer executable instructions for use in a system for adjusting a drivable portion within road boundaries of a two dimensional virtual representation of a road for path planning within the drivable portion by a path planning unit of an autonomous vehicle, the system including a retrieval unit, an uncertainty unit, and an adjustment unit, wherein the executed instructions cause the system to:

retrieve a measured position of the vehicle with respect to a reference and a measured heading angle of the vehicle with respect to the reference in the retrieval unit, wherein the reference comprises a landmark on the road, a Global Positioning System (GPS) map position, or a position in a fixed coordinate system;

receive as input the measured position, the measured heading angle and map data of the road in the uncertainty unit;

generate a number of samples from a probability distribution, where each sample comprises a position estimate and a heading angle estimate;

determine for each sample the portion in front of the vehicle which is drivable;

accumulate the portions determined to be drivable;

compute the drivable portion of the two-dimensional virtual representation of the road, from the accumulated portions determined to be drivable, to be a portion in which an amount of samples generated with the respective position estimate and the respective heading angle estimate is higher than a threshold;

determine, in the uncertainty unit, a position uncertainty value and a heading angle uncertainty value representing an amount of uncertainty in the vehicle's position and heading angle, respectively, on the road based on the input and the probability distribution; and adjust a width and a heading angle of a drivable portion of the two dimensional virtual representation of the road ahead of the autonomous vehicle in an adjustment unit, wherein the adjustment of the width and heading angle is based on the position uncertainty value and the heading angle uncertainty value, respectively, and the drivable portion is provided to the path planning unit for path planning within the drivable portion.

* * * * *